United States Patent

[11] 3,633,845

[72] Inventor: Edric Raymond Brooke
Bishops Stortford, England
[21] Appl. No.: 867,285
[22] Filed: Oct. 17, 1969
[45] Patented: Jan. 11, 1972
[73] Assignee: English Numbering Machines Limited
Enfield, England
[32] Priority: Oct. 23, 1968
[33] Great Britain
[31] 50,342/68

[54] MOUNTING ARRANGEMENT FOR AN ELONGATED RECORD CARRIER
7 Claims, 13 Drawing Figs.

[52] U.S. Cl. .................................................. 242/198
[51] Int. Cl. .................................................. G03b 1/04,
G11b 15/32, G11b 23/04
[50] Field of Search ............................. 242/197–200

[56] References Cited
UNITED STATES PATENTS
2,687,259  8/1954  Owens ........................... 242/198 X
2,969,929  1/1961  Rudzitis ........................... 242/199

*Primary Examiner*—Leonard D. Christian
*Attorney*—Nolte and Nolte

ABSTRACT: A mounting arrangement for an elongated record carrier is disclosed in which a cassette is engageable in an operative position in a receptacle. A guide path comprising a rib member projecting from the floor of the receptacle and a cooperating groove in the cassette are provided for guiding the cassette into and out of an operative position in the receptacle.

The cassette is provided with spools which are locked by spring loaded locking means when the cassette is not located within the receptacle. As the cassette is inserted in the guide path, the spool locking means are so engaged by a projecting abutment in the receptacle that the spools are unlocked as the cassette is moved towards its operative position.

The receptacle is provided with a retaining member which can be displaced from an initial position by depressing a button mounted on the wall of the cassette receptacle when the cassette is located in its operative position. The retaining member may then be displaced to such a position that it so engages a part of the body of the cassette, that the cassette cannot be withdrawn from the receptacle until the retaining member is returned to its initial position.

INVENTOR
EDRIC RAYMOND BROOKE
BY
Nolte & Nolte
ATTORNEYS

MOUNTING ARRANGEMENT FOR AN ELONGATED RECORD CARRIER

CROSSOREFERENCES TO RELATED APPLICATIONS

The tape cassette which is referred to herein and indicated by reference 3 in the drawings is further described in copending British application, No. 50341/68 (reference 4554). The deformable gear which is referred to herein and indicated by reference 7 in the drawings is further described in copending British application, No. 50340/68 (reference 4555) and the pressure member which is referred to herein and indicated by reference 4 in the drawings is further described in copending British application, No. 50339/68 (reference 4556).

BACKGROUND TO THE INVENTION

This invention relates to improvements in a mounting arrangement for an elongated record carrier of the kind in which a cassette is engageable in an operative position in a receptacle.

A disadvantage of previously known mounting arrangements is that the cassette may be so inserted in a receptacle that it is incorrectly orientated. Also, even if the cassette is correctly orientated it may not be accurately located in the correct operative position or, even if it is initially so located, it may become dislodged.

In some applications of mounting arrangements for elongated record carriers, such as to tape recording and reproducing devices, for example, when such transducing devices are used as dictating machines, it is often necessary for a cassette to be inserted in the receptacles of different dictating machines for recording and for reproduction, respectively.

It is a disadvantage of known mounting arrangements for tape recording and reproducing devices, that the tape may become displaced in the cassette while the cassette is in transit from the office where the tape is dictated to the office where the tape is reproduced, and such displacement may result in appropriate passages on the tape being reproduced.

SUMMARY OF THE INVENTION

Accordingly, it is an object of the present invention to provide improved mounting arrangements for an elongated record carrier wherein the aforementioned disadvantages are substantially reduced.

According to the present invention, there is provided a mounting arrangement for an elongated record carrier comprising a cassette receptacle, a track for guiding the cassette to its operative position, means engageable with a spool-locking device on the cassette for unlocking the spool-locking device when the cassette moves to its operative position, and means for retaining the cassette in its operative position.

An advantage of a mounting arrangement in accordance with the present invention is that the track for guiding the cassette to its operative position ensures that the cassette is correctly aligned.

Another advantage of a mounting arrangement in accordance with the present invention is that the means for retaining the cassette in the receptacle can only be operated when the cassette is located in its correct operative position and, once the retaining means has been operated, the cassette cannot be accidentally dislodged.

A further advantage of a mounting arrangement in accordance with the present invention is that the means for locking the spools in the cassette are so arranged that the spools are automatically locked whenever the cassette is removed from the receptacle, and automatically unlocked as the cassette is inserted in the cassette receptacle.

BRIEF DESCRIPTION OF THE DRAWINGS

Embodiments of the invention will now be described by way of example with reference to the accompanying drawings, in which.

DESCRIPTION OF THE PREFERRED EMBODIMENTS

Figure 1:
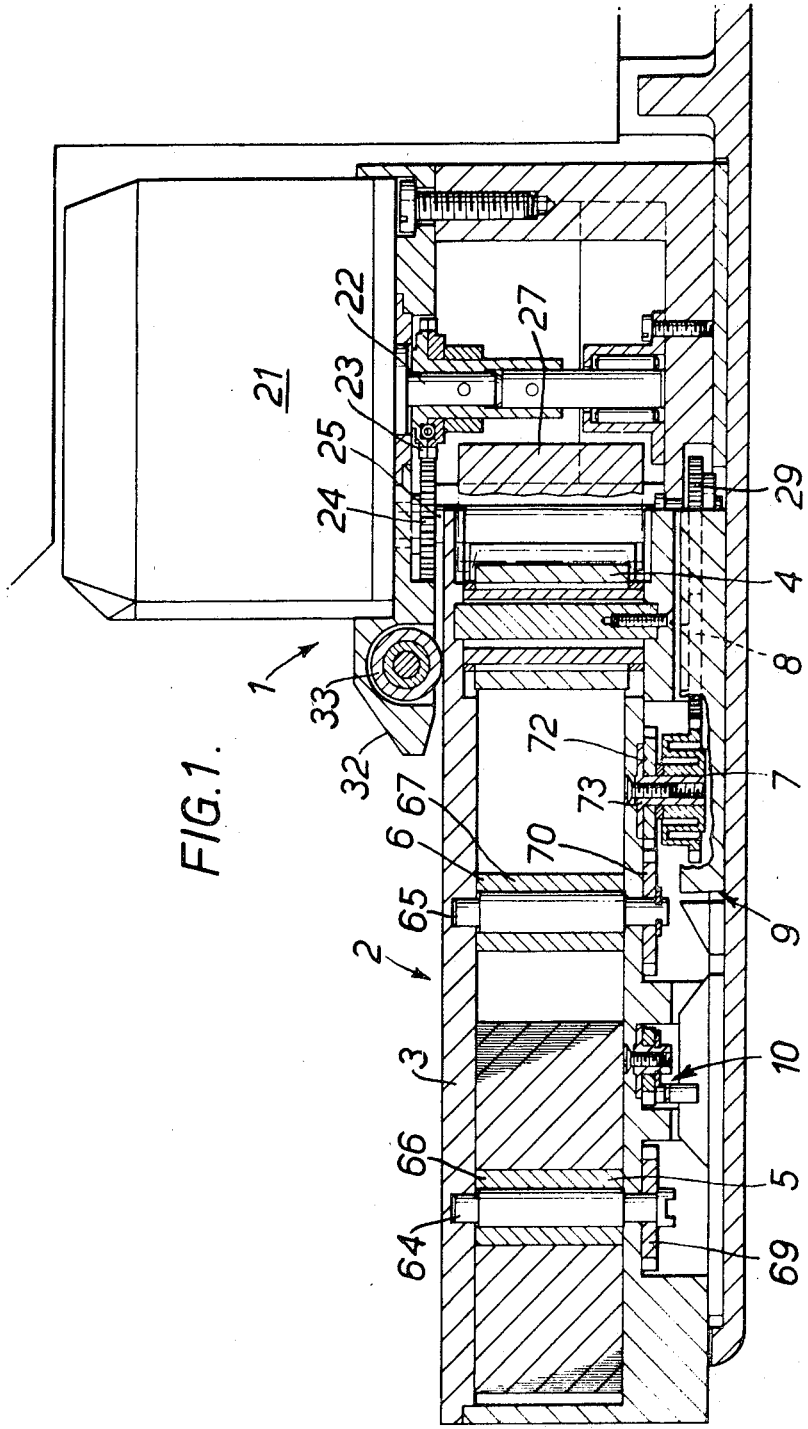
FIG. 1 is a sectional side elevation of a tape recording or reproducing device, showing a tape cassette in its operative position.

FIG. 1 shows a tape recording or reproducing device indicated generally by reference numeral 1. The device comprises a cassette receptacle 2 shown with a tape cassette 3 positioned therein. The tape cassette 3 is provided with a pressure member 4 and has a feed spool 5 and a takeup spool 6. The takeup spool is driven by a deformable gearwheel 7 through gearing 8 indicated in broken lines and provided in the device 1. The cassette receptacle 2 is also provided with a guide arrangement indicated generally at 9 which cooperates with the cassette 3 for ensuring correct insertion of the cassette 3 into the device 1. The guide arrangement 9 also serves to unlock a spool-locking arrangement indicated at 10 when the cassette is correctly positioned in the cassette receptacle 2.

As shown in FIGS. 1 to 4, the recording or reproducing device 1 comprises a stepping drive motor 21 on whose shaft 22 an antibacklash gearwheel 23 is provided which meshes with a gear wheel 24 on a shaft 25. The shaft 25 carries or forms a capstan 26 for driving the tape in the cassette 3 across a recording or reproducing head 27. A gearwheel 29 on the shaft 25 meshes with the gearing 8 which in turn meshes with the deformable gear 7 on the cassette 3, a slipping clutch 28 (FIG. 2) being provided in the drive between the motor 21 and a takeup spool hub 67.

The cassette receptacle 2 provided on the recording or reproducing device 1 comprises a boxlike arrangement having an opening at one end 30 (FIG. 2) for the insertion of the cassette 3, another opening at another end 31 for a recording or reproducing head 27 and a drive mechanism, and a further opening at the top to assist insertion of the cassette 3. The top of the receptacle 2 is covered by a cover (not shown) when the device 1 is in use. The end of the receptacle 2 near the head 27 is closed by an extension 32 provided with a roller 33 for locating the cassette in a vertical plane.

Within the receptacle 2, the guide arrangement 9 is situated which comprises a raised rib member 36 having a movable extension piece 37 carried by a bar 38 (FIG. 4) which is slidable transversely of the receptacle 2 and is provided with a projection 40 towards one end of the bar. The projection 40 is pointed at its free end 41 for engagement with a recess 42 or 43 on a member 44. The recesses 42 and 43 control the position of the bar 38 in its engaged and disengaged positions. The member 44 is urged towards the rod 38 by means of a spring 45, one end of which engages the member 44 and the other end of which engages a plunger 46 in engagement with a wall 47 of the receptacle 2. The rod 38 is extended, by a portion 48 (FIG. 2), up a sidewall 49 of the receptacle 2 and extends, in its position 51 shown in FIGS. 2 and 4, above and over an upper edge 50 (FIG. 2) of the sidewall 49. A pushbutton 52 is provided in the wall 49 and engages the portion 48 of the bar 38. A portion 54 of the raised rib member 36 extends upwardly from the base of the receptacle 2 for unlocking the spools 5 and 6 of the cassette 3 and forms effectively an extension of the raised rib member 36.

Figure 5:
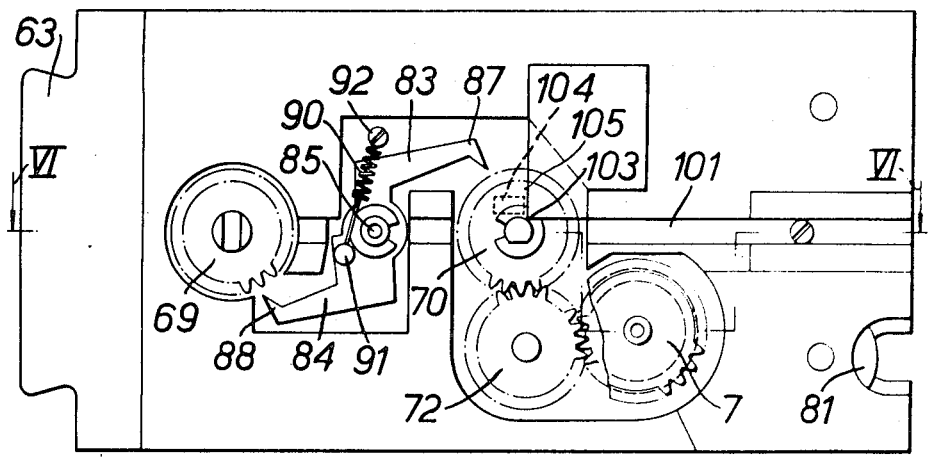
FIG. 5 is an underneath view of the cassette shown in FIG. 1.
Figure 6:
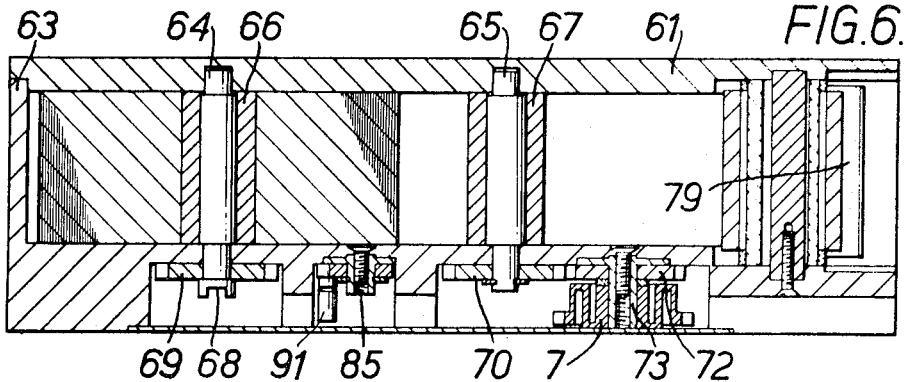
FIG. 6 is a sectional view of the cassette of FIG. 5 taken on the line VI—VI.
Figure 7:
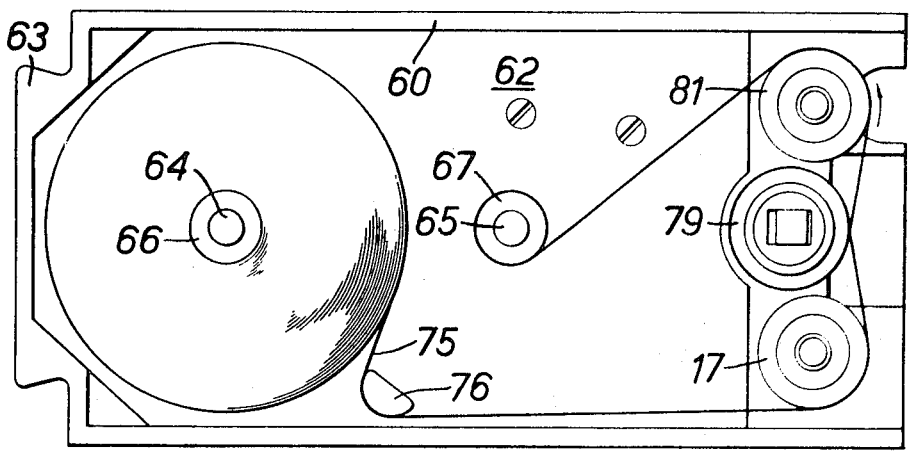
FIG. 7 is a plan view of the cassette of FIG. 5 with its top plate removed.

The cassette 3, shown in FIGS. 5, 6 and 7 comprises a casing 60 (FIG. 7) including two sidewalls 61 (FIG. 6) and 62 (FIG. 7) and an end wall 63 which is shaped as a handle portion for the insertion of the cassette into the receptacle 2 of the device 1. Extending across the two sidewalls 61 and 62 are two shafts 64 and 65 (FIGS. 6 and 7) which respectively carry a feed spool hub 66 acting as the feed spool 5 and a takeup spool hub 67 acting as the takeup spool 6. The shaft 64 extends through the sidewall 62 of the casing and is provided with a gear wheel 69 mounted for rotation with the shaft 64 so that it rotates with the spool hub 66. A coupling 68 is provided for rewind purposes. The spool hub shaft 65 extends through the sidewall 62 and carries thereon a gearwheel 70 mounted for rotation with the spool hub 67. The gearwheel 70 is in engagement with a gearwheel 72 carried by a sleeve 73 on which the deformable gear is mounted.

A tape passes from the feed spool hub 66 around a tape guide 76 (FIG. 7) to the front end of the cassette 3 and passes around an idler roller 77 over a pressure roller 79 and over a further idler roller 81 engageable through the tape with the capstan 26 (FIG. 3) on the device 1. The tape 75 passes from the idler roller 81 directly to the spool hub 67.

The tape passing over the pressure roller 79 is indicated in a position which it takes up when it is in contact with the recording or reproducing head 27 of the device 1.

The cassette 3 is provided with a locking device comprising two arms 83 and 84 connected to the bottom of the cassette 3 by pivots 85 (FIG. 5). The arms 83 and 84 are provided with hooked ends 87 and 88 respectively which, when in the locking position, engage in teeth of the gearwheels 70 and 69. In the position shown in FIG. 5, the locking device is unlocked but is urged to the locking position by a spring 90 acting between a projection 91 on the arm 84 and a bolt 92 on the underside of the casing. In the locked condition of the locking device, the projection 91 takes up a position in which it is in line with a channel 101 (FIG. 5), which runs, with gaps therein, for the greater part of the length of the cassette casing for cooperation with the guide arrangement 9 (FIG. 1) of the device 1.

Figure 2:
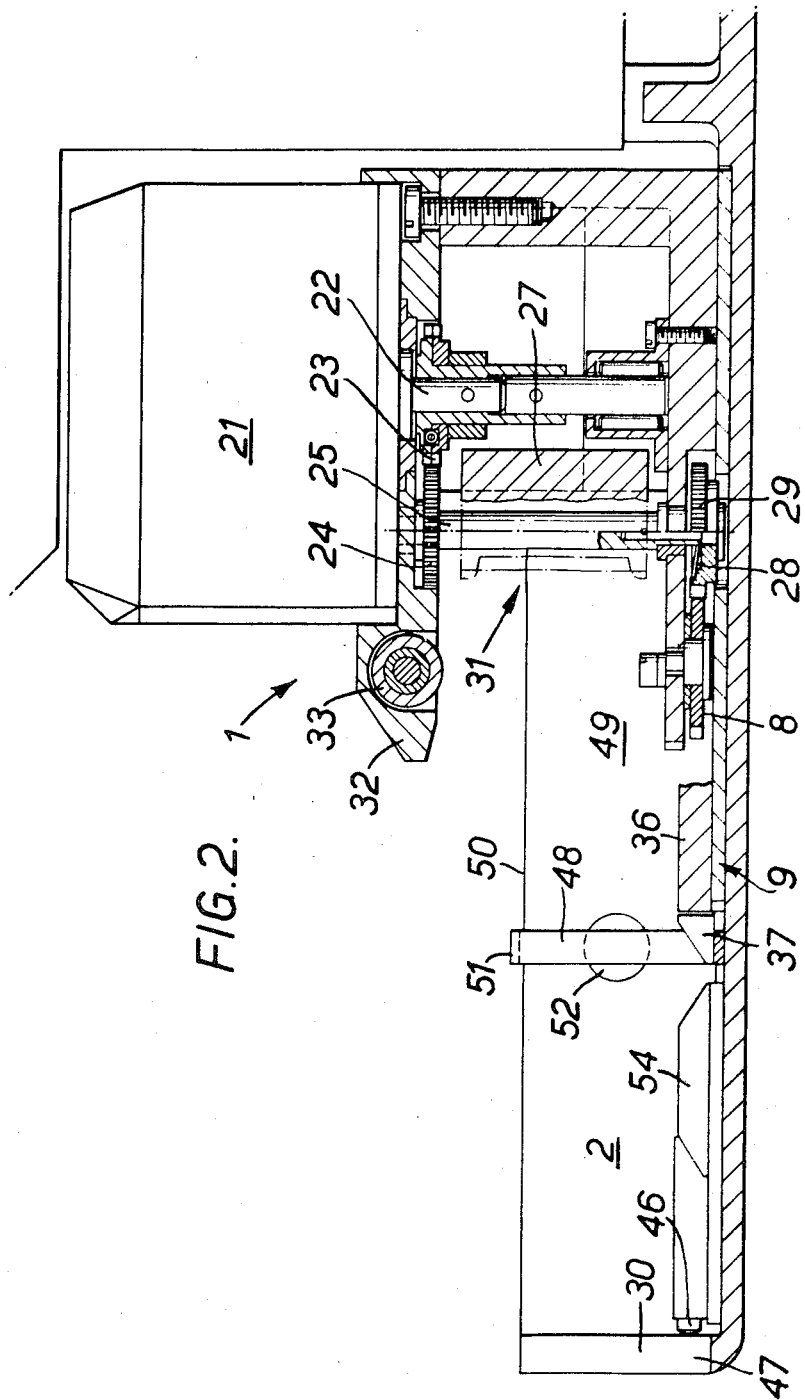
FIG. 2 is a view similar to FIG. 1 but showing the recording or reproducing device without the cassette.
Figure 4:
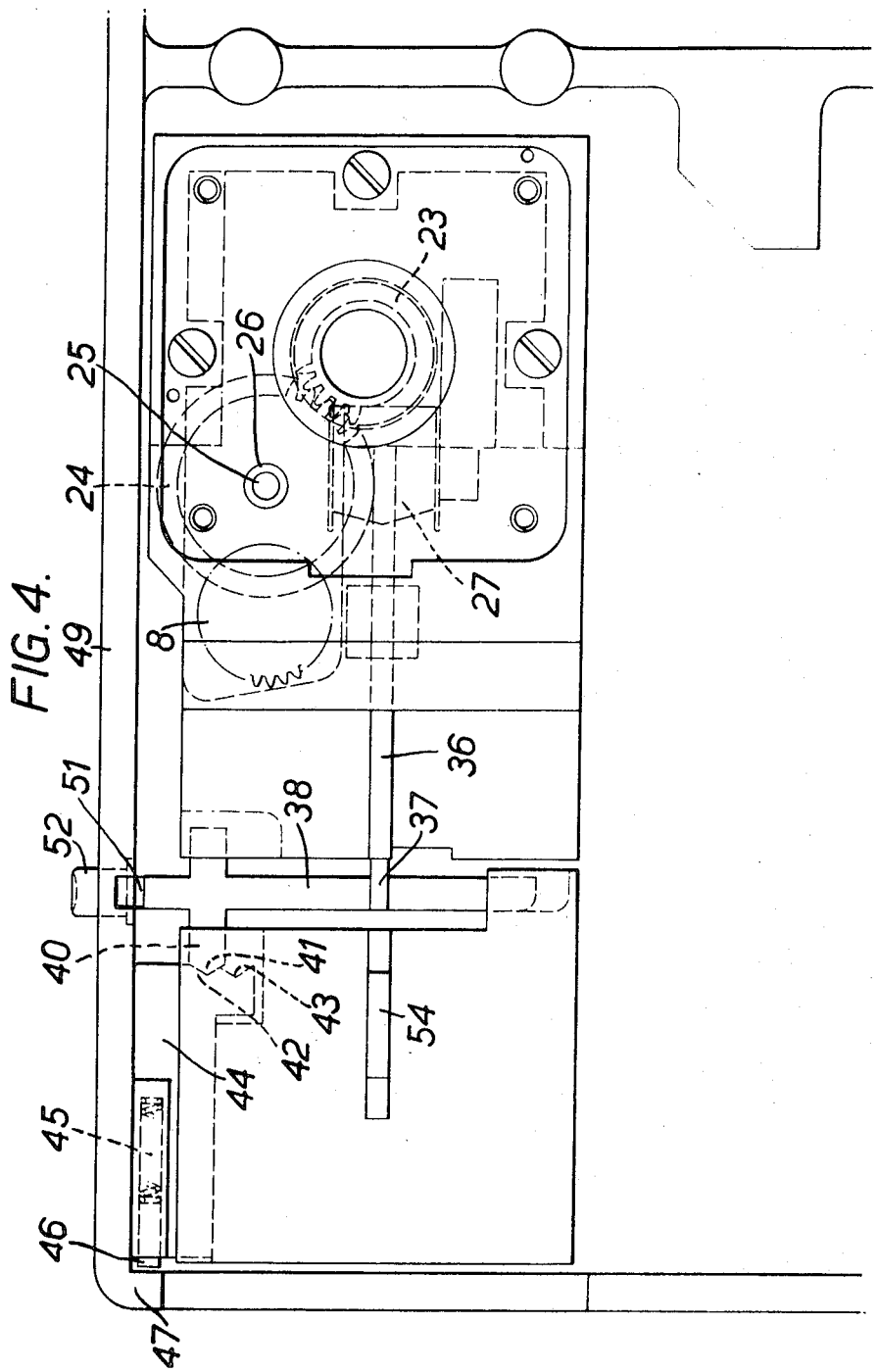
FIG. 4 is a plan view of the recording or reproducing device without the cassette as shown in FIG. 2.

The insertion of the tape cassette just described into the reproducing and/or recording device 1 will now be described:

Initially the device 1 is in the position shown in FIGS. 2 and 4. In this position the cover (not shown) of the cassette receptacle 2 has been removed, the extension 48 of the bar 38 is in its outermost position with the portion 51 extending over the upper surface 50 of the wall 49 so that the cover cannot be reengaged on the receptacle. The pushbutton 52 extends out of the wall 49, and the projection 40 is engaged in the recess 42. A microswitch arrangement (not shown) is provided for determining the presence or absence of the cover of the receptacle 2, and, in its absence, prevents operation of the device 1.

The cassette 3 is then placed towards the left-hand end of the receptacle 2 as viewed in the drawings. It may be inserted largely from above or may be slid in sideways through the opening 30. In this position, the groove 101 (FIG. 5) lies over the raised rib member 36 and the projection 54.

Figure 3:
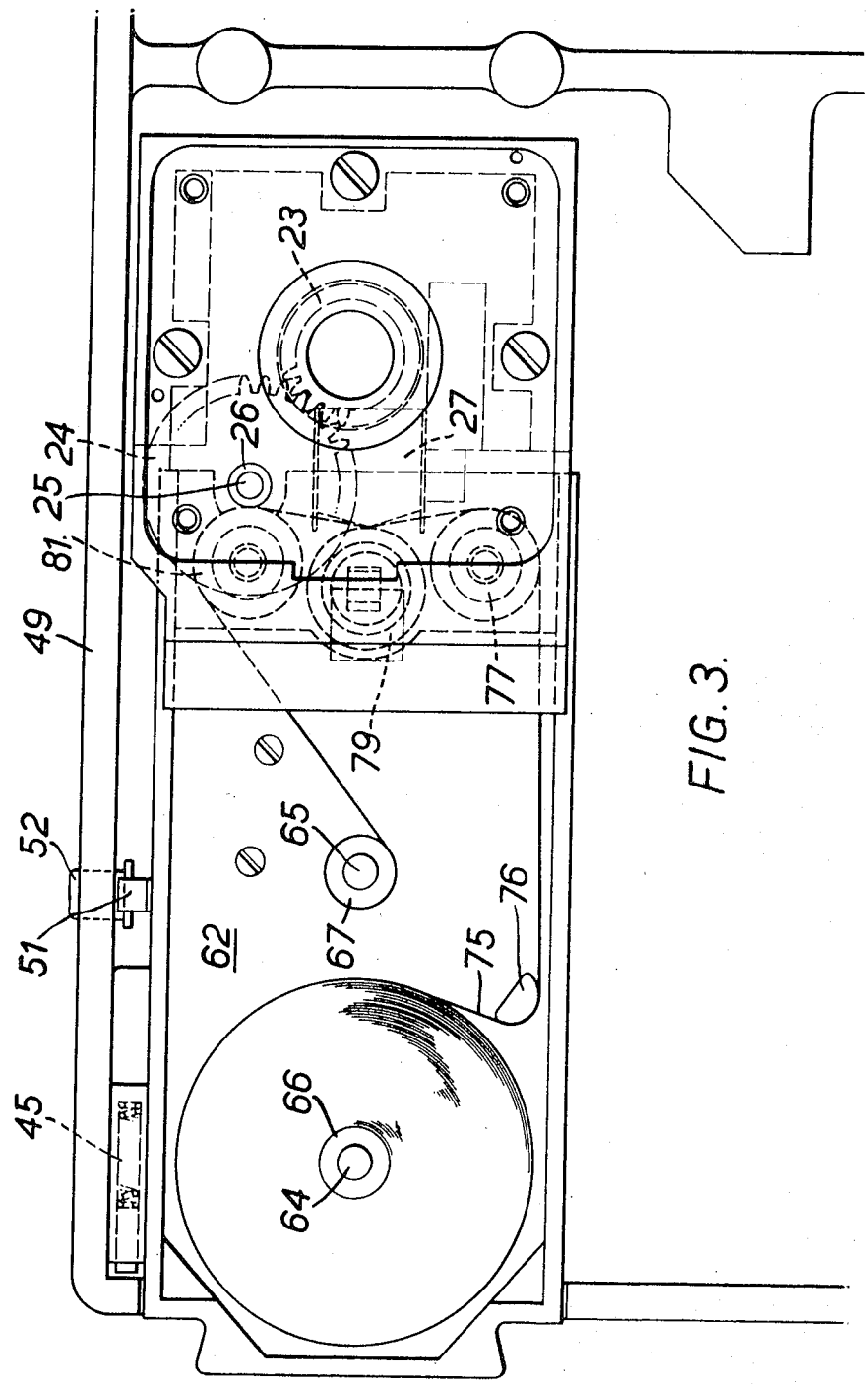
FIG. 3 is a plan view of the recording or reproducing device and the cassette as shown in FIG. 1.

The cassette is then pushed by means of its handle 63 to the right. This action moves the cassette along the raised rib member 36 until the end of the cassette is located under the roller 33, the deformable gear 7 is in engagement with the gearwheel 8, and the idler roller 81 (FIGS. 3 and 7) is in engagement with the capstan 26. This movement of the cassette 3 also causes the releasing pin 91 of the cassette-spool-locking mechanism, which in the locked position is located in the path of the groove 101, to be engaged by the projection 54, by which it is pushed from its position aligned with the groove 101 into the position shown in FIG. 5. This movement of the pin 91 withdraws the hooklike end portions 87 and 88 of the arms 83 and 84 of the locking device from the teeth of the gearwheels 70 and 69, thus unlocking the spools ready for use. The pressure member 79 is in a position in which it is urging the tape 75 against the head 27 as shown in FIG. 3.

Once the cassette is fully home, the movable projecting retaining member 37 (FIG. 2 and FIG. 4) clears the edge 103 (FIG. 5) of the groove 101, and then can be pushed, by means of the pushbutton 52 transversely so that it takes up a position, indicated in broken lines 104, behind an edge 105 on the tape cassette (see FIG. 5). This movement of the bar 38 retains the cassette 3 in the device 1, and moves the projection 40 (FIG. 4) out of the recess 42 and in to the recess 43, and clears the portion 51 from the upper edge 50 of the wall 49 of the receptacle 2. The member 51 is thus clear of the cover which is replaced on the receptacle, allowing the device 1 to be put into operation.

When the recording or reproducing has finished, the cover of the receptacle 2 is lifted, giving access to the portion 51 on the extension 48 of the bar 38. The extension 48 can then be moved so that the portion 51 projects over the upper edge 50 of the wall 49 so as to move the bar 38 from its engaged position, in which the projection 40 is engaged in the recess 43, to the disengaged position shown in FIG. 4 in which the projection 40 is engaged in the recess 42. This movement of the bar 38 returns the portion 37 into line with the groove 101, thus releasing the cassette 3 which can then be withdrawn to the left. As the cassette 3 is disengaged from the tape mechanism the pin 91 of the locking arrangement for the spools of the cassette clears the end of the projection 54 and returns to its locking position under the action of the spring 90, thus causing the hook portions 87 and 88 of the locking means, to engage teeth of the gearwheels 70 and 69 to lock the spools in position.

When the cassette 3 has been moved to the left to clear the extension 32 (FIGS. 1 and 2), the cassette may either be lifted from the receptacle, or may be pulled further to the left until it is completely withdrawn.

FIGS. 8 to 11 show an alternative form of cassette which can be used in the recording or reproducing device 1 in place of the cassette 3. This is a smaller cassette which is used when only a relatively short length of tape is required.

The cassette comprises two spools 111 and 112 (FIG. 9) fixed on shafts 113 and 114 respectively in a casing 115. Carried on the shafts 113 and 114 are deformable wheels 117 and 118 (FIG. 11) respectively, which rotate with the shafts 113 and 114. When the cassette is in the cassette receptacle 2, the gearwheel 117 meshes with the gearwheel 8, which is similarly used when the cassette is employed in a reverse direction machine, normally, as a reproducing machine.

A tape 120 (FIG. 9) passes from the spool 111 to the spool 112 or vice versa by way of two idler rollers 121 and 122 which are driven, depending on the direction of travel of the tape by capstans on the reproducing and/or recording device, such as the capstan 25 of the device 1, which enter recesses 123 and 124 in the cassette casing 115. Pressure is exerted on the tape 120 by a pressure pad 126 so as to push the tape against a tape head (such as the tape head 27 of FIG. 3) on the recording and/or reproducing device. The pad 126 is mounted in a holder 127 carried on a bar 128 having a slot 129 in which is positioned a pin 130 attached to the casing 115 and to a cross member 132. The cross member 132 has an extension 133 to which is pivoted a lever 135. The lever 135 is in turn pivoted at 136 to the bar 128. A spring 137 (FIG. 10) is provided for urging the bar 128 to the right in FIGS. 9 and 10, i.e., in a direction for engagement with the tape head.

The pressure pad 126 is guided by the pin and slot 130, 129 and the lever 135 to provide a movement of the bar 128 which is not quite on a straight line whereby any tendency to jam or stick may be prevented.

Figure 8:
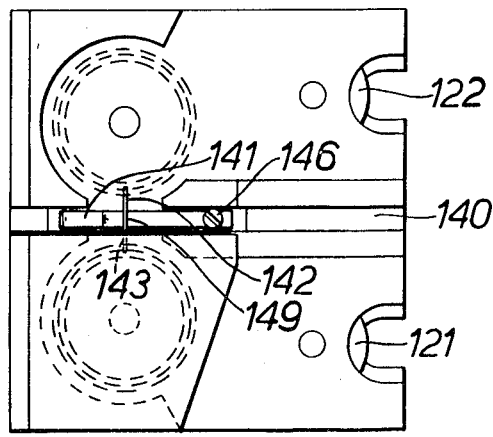
FIG. 8 is an underneath view of an alternative cassette usable with the device of FIG. 1.

The underside of the cassette, as shown in FIG. 8, is provided with a groove 140 which, when the cassette is inserted in the device 1, engages the raised rib member 36 for guiding the cassette.

Figure 10:
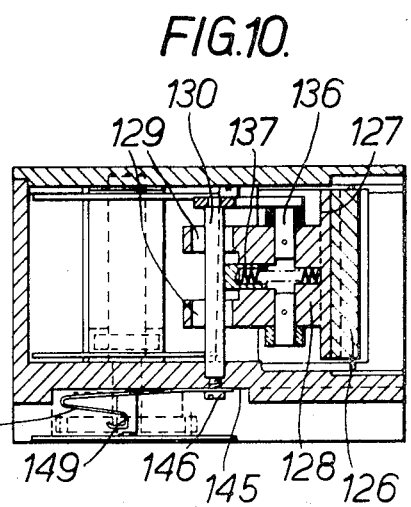
FIG. 10 is a sectional view taken on the line X—X of FIG. 9.
Figure 9:
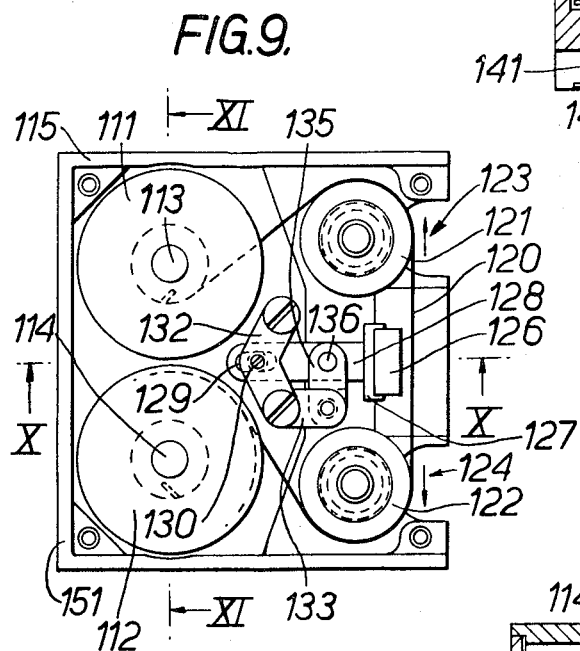
FIG. 9 is a plan view of the cassette of FIG. 8.

A locking device for the tape spools 111 and 112 comprises a bent strip 141 (FIG. 8) of spring material provided with transversely extending members 142 and 143, which in the locking position engage teeth of the deformable gearwheels 117 and 118. The strip 141 is held in a recess 145 in the groove 140 by means of a bolt 146 (FIG. 10). The strip 141 has an abutment portion 149 by which the projections 142 and 143 can be raised out of engagement with the teeth of the deformable gearwheels 117 and 118 by the raised portion 36 (FIG. 2 and FIG. 4) of the device 1.

Figure 11:
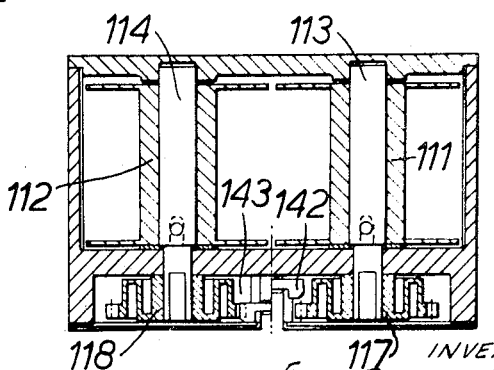
FIG. 11 is a sectional view taken on the line XI—XI of FIG. 9.

FIG. 11 shows the projection 142 in the disengaged position and the projection 143 in the engaged position.

In use, this cassette operates in a way similar to that of the cassette 3 of FIGS. 5 to 7. However, the unlocking action is provided by the members 37 and 36 which are used because of the shorter length of the alternative form of cassette. The retention of the cassette in its operative position in the device 1 is achieved by movement of the member 37 from its alignment with the groove 140 to a position in which it engages the rear wall 151 of the casing 115.

Figure 12:
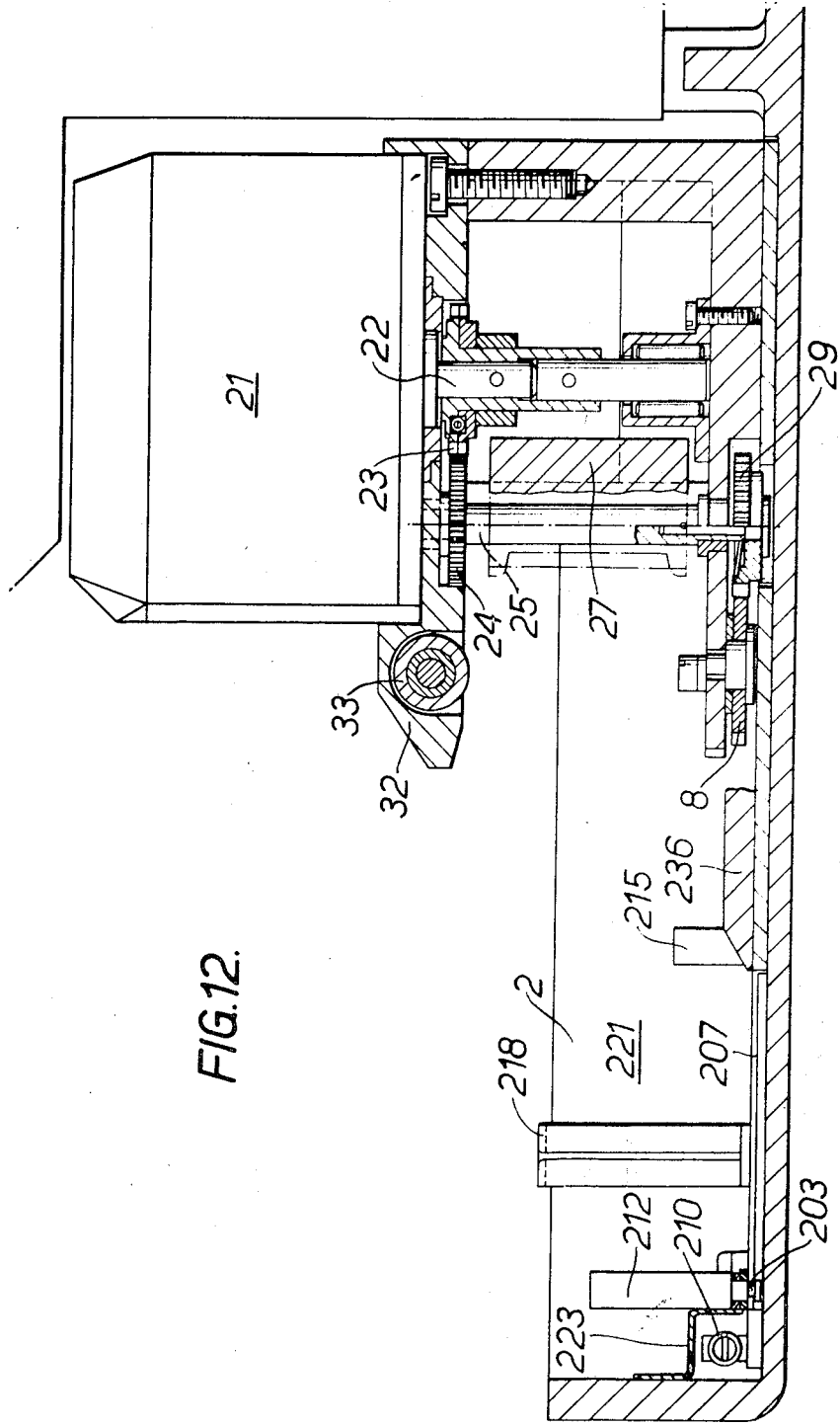
FIG. 12 is a sectional view similar to FIG. 2, but showing another embodiment of the invention.
Figure 13:
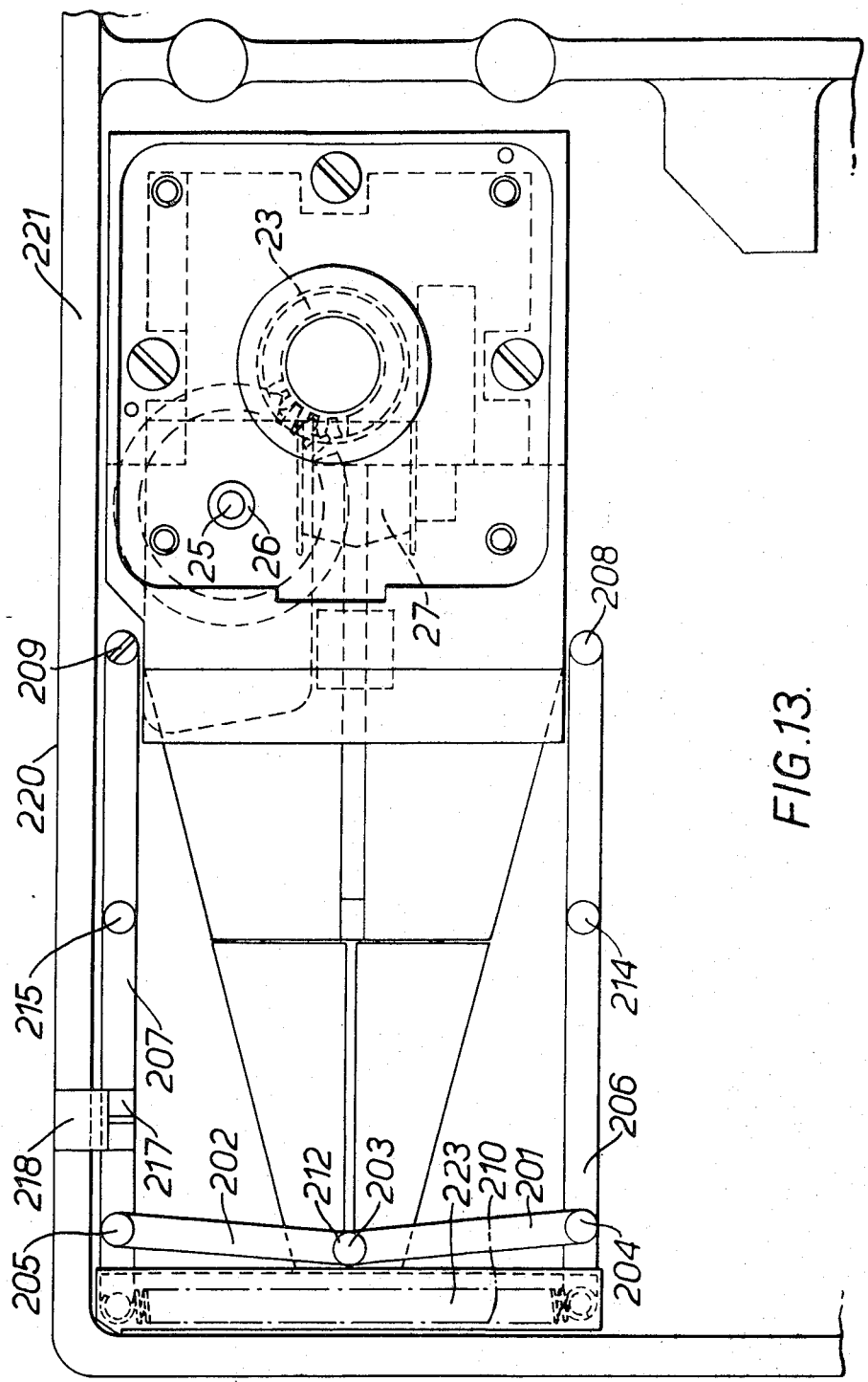
FIG. 13 is a plan view of the recording or reproducing device of FIG. 12.

FIGS. 12 and 13 show an alternative recording or reproducing device to that shown in FIGS. 1 to 4. The driving mechanism is the same as that shown in FIGS. 1 to 4 and for this reason appropriate parts thereof have been given the same reference numerals and will not be further described. The difference between the device of FIGS. 12 and 13 and the device of FIGS. 1 to 5 lies in the means for guiding the tape cassette. This guiding means is suitable for use with the cassette of FIGS. 8 to 11 and, if suitably modified, may be applied to the cassette of FIGS. 5 to 7.

As previously, the alternative device comprises a tape cassette receptacle 2 in which is positioned a raised portion 236 (FIG. 12) cooperates with the groove 140 (or 101) in the cassette. A toggle consisting of levers 201 and 202 pivoted together at 203 is pivoted at 204 and 205 to levers 206 and 207 which are in turn pivoted at 208 and 209 to the base of the receptacle 2. The levers 206 and 207 are joined at their free ends by a tension spring 210 which urges the free ends together. An upwardly extending projection 212 is provided on the pivot 203. Similar but smaller projections 214 and 215 are provided towards the middle of the levers 206 and 207 respectively. Attached to the lever 207 at a point between the pivot 205 and the projection 215 is an extension 217 directed upwardly and having a portion 218 extending over the edge surface 220 of the receptacle wall 221.

The operation of the guiding arrangement is as follows:

With the parts of the device in the position shown in FIGS. 12 and 13, and, with the cover (not shown) of the receptacle 1 removed, the cassette is placed towards the left-hand end of the receptacle between the projections 215 and 214 so that its groove 140 (or 101) engages the raised portion 236. The projection 212 is moved to the right to engage the rear wall of the cassette. In doing so it passes through its dead center position and urges the cassette to the right under the action of the spring 210. The spring 210 may be made strong enough so that sufficient force will be supplied by the projection 212 to move the cassette to the right. As the cassette moves to the right, the free ends of the levers 206 and 207 approach each other under the action of the spring, and, as the cassette clears the projections 214 and 215, the projections 214 and 215 take up the position behind the rear wall of the cassette and so prevent unintentional disengagement or removal of the cassette. Movement of the levers 206 and 207 moves the portion 218 out of the way of the cover, which can then be closed.

To disengage the cassette from the mechanism, the cover is opened and the projection 212 is moved to the left, thus releasing the cassette, and on passing its dead center position is pushed to the left by spring 210 and is then prevented from further motion by a housing 223 which houses the spring 210.

The cassette may thus be drawn to the left and removed through the open portion of the cassette receptacle.

If it is desired to use the larger cassette shown in FIGS. 5 to 7, the cassette receptacle 2 is modified so as to accommodate the large cassette. Also provision may be made for enabling the toggle projection 212 to be positioned out of the way during the initial movement of the tape cassette into the receptacle. This may be carried out by having a removable stop instead of the casing 223 which would allow the projection 212 to extend out of the wall of the cassette receptacle through an aperture provided to accommodate the larger cassette. The positioning of the projections 214 and 215 also requires adjustment. Also the spring 210 is to be positioned below the level of the cassette so as to allow the cassette to be inserted.

Although, in the embodiment of the invention which has been described above, the invention is applied to a mounting arrangement for a magnetic tape recording and/or reproducing device, it will be appreciated that the invention can be applied to mounting arrangements for other forms of elongate record carriers, for example, paper tape record carriers.

I claim

1. A mounting arrangement for an elongated record carrier comprising, in combination:
   a cassette receptacle;
   a cassette engageable in an operative position in said receptacle;
   a raised rib member in a sidewall of said receptacle for guiding said cassette into and out of said operative position;
   a groove in said cassette to cooperate with said rib member;
   spool-retaining means mounted within said cassette;
   a spool-locking device on said cassette;
   releasing means located in said groove to engage said rib member and thereby release said spool-locking device when said cassette is located in said operative position; and
   retaining means selectively operable to retain said cassette in said operative position.

2. An arrangement as defined in claim 1, comprising a movable projecting retaining member in said receptacle, said retaining member being movable from a first position in which said retaining member is out of engagement with said cassette to a second position in which said retaining member engages a part of said cassette to retain said cassette in said operative position.

3. An arrangement as defined in claim 2, wherein said retaining member, when in said first position, is aligned with said rib member and is located in said groove and, when in said second position, said retaining member is nonaligned with said rib member and is in engagement with said part of said cassette to retain said cassette in said operative position.

4. An arrangement as defined in claim 2, wherein said retaining means comprises a bar disposed transversely across said cassette receptacle, said bar being provided with an extended portion and with said retaining member, said extended portion projecting over an edge of a sidewall of said receptacle when and only when said retaining member is in said first position.

5. An arrangement as defined in claim 2, wherein said retaining member is pivotably mounted and, when in said first position, is located at one side of said cassette receptacle and, when in said second position, engages a wall of said cassette to retain said cassette in said operative position.

6. An arrangement as defined in claim 1, wherein said retaining means comprise:
   two levers pivotably supported on opposite sides of said cassette receptacle;
   tension spring means connected between the free ends of said levers;
   a toggle mechanism connected between portions of said levers intermediate said pivots and said free ends; and
   two projecting retaining members each mounted on a respective one of said levers;

whereby, when said toggle mechanism is at one side of its dead center position, said tension spring urges the lever ends together and causes said projecting retaining members to be located behind the cassette to retain said cassette in said operative position.

7. An arrangement as defined in claim 6, comprising an extended portion on one of said levers, said extended portion projecting over an edge of a sidewall of said cassette receptacle when and only when said toggle mechanism is at the respective other side of its dead center position.

* * * * *